(12) United States Patent
Dolog et al.

(10) Patent No.: US 9,702,217 B2
(45) Date of Patent: Jul. 11, 2017

(54) SWELLABLE SEALING SYSTEMS AND METHODS FOR INCREASING SWELLING EFFICIENCY

(71) Applicants: Rostyslav Dolog, Houston, TX (US); Oleg A. Mazyar, Katy, TX (US); Sankaran Murugesan, Katy, TX (US); Valery N. Khabashesku, Houston, TX (US)

(72) Inventors: Rostyslav Dolog, Houston, TX (US); Oleg A. Mazyar, Katy, TX (US); Sankaran Murugesan, Katy, TX (US); Valery N. Khabashesku, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/704,112

(22) Filed: May 5, 2015

(65) Prior Publication Data
US 2016/0326829 A1    Nov. 10, 2016

(51) Int. Cl.
*E21B 33/127* (2006.01)
*C09K 8/44* (2006.01)

(52) U.S. Cl.
CPC ............ *E21B 33/1277* (2013.01); *C09K 8/44* (2013.01)

(58) Field of Classification Search
CPC .............................. C09K 8/44; E21B 33/1277
See application file for complete search history.

(56) References Cited

U.S. PATENT DOCUMENTS

| | | | |
|---|---|---|---|
| 3,658,131 A * | 4/1972 | Biles | C09K 8/5045 166/270 |
| 6,380,456 B1 | 4/2002 | Goldman | |
| 6,508,305 B1 | 1/2003 | Brannon et al. | |
| 7,431,098 B2 | 10/2008 | Ohmer et al. | |
| 8,181,708 B2 | 5/2012 | Korte et al. | |
| 2005/0205266 A1* | 9/2005 | Todd | E21B 33/12 166/376 |
| 2007/0056735 A1 | 3/2007 | Bosma et al. | |
| 2007/0221379 A1* | 9/2007 | Brothers | C04B 18/141 166/293 |
| 2008/0277109 A1* | 11/2008 | Vaidya | E21B 33/1208 166/118 |
| 2009/0084550 A1 | 4/2009 | Korte et al. | |

(Continued)

FOREIGN PATENT DOCUMENTS

| | | |
|---|---|---|
| EP | 0662249 B1 | 1/1997 |
| EP | 2282001 A2 | 2/2011 |
| WO | 2012128747 A1 | 9/2012 |

OTHER PUBLICATIONS

F. De Dardel, T.V. Arden, Ion exchangers, Ullmann's Encyclopedia of Industrial Chemistry, pp. 476-477, vol. 19, 2012, Wiley-VCH Verlag GmbH & Co. KGaA, Weinheim.

(Continued)

*Primary Examiner* — Silvana Runyan
(74) *Attorney, Agent, or Firm* — Cantor Colburn LLP

(57) ABSTRACT

A sealing system comprises an article including a swellable composition comprising an elastomer and a super absorbent material; and an ion reducing material disposed with the swellable composition, the ion reducing material comprising one or more of the following: a chelating agent; a cation precipitating agent; or an anion precipitating agent.

18 Claims, 2 Drawing Sheets

(56) References Cited

U.S. PATENT DOCUMENTS

| | | |
|---|---|---|
| 2009/0101355 A1 | 4/2009 | Peterson et al. |
| 2010/0016183 A1* | 1/2010 | Roddy ............... C04B 20/10 507/225 |
| 2010/0147507 A1 | 6/2010 | Korte et al. |
| 2010/0256018 A1 | 10/2010 | Ezell et al. |
| 2010/0326649 A1 | 12/2010 | Spacey et al. |
| 2011/0139466 A1 | 6/2011 | Chen et al. |
| 2011/0198071 A1* | 8/2011 | Swearingen ......... B09C 1/002 166/50 |
| 2012/0175134 A1 | 7/2012 | Robisson et al. |
| 2012/0202047 A1 | 8/2012 | Welch et al. |
| 2012/0227986 A1 | 9/2012 | Sevre |
| 2013/0118759 A1* | 5/2013 | Crews ................ E21B 29/00 166/376 |
| 2013/0126185 A1* | 5/2013 | Mazyar ............ E21B 33/1208 166/373 |
| 2013/0126190 A1 | 5/2013 | Mazyar et al. |
| 2013/0146312 A1* | 6/2013 | Gerrard ................ C09K 8/44 166/387 |
| 2013/0210684 A1* | 8/2013 | Ballard ................ C09K 8/52 507/201 |
| 2013/0213657 A1* | 8/2013 | Dobson, Jr. ........... C09K 8/24 166/308.5 |

OTHER PUBLICATIONS

Harry P. Gregor et al., "Ion-Exchange Resins. X. Magnesium-Potassium Exchange With a Polystyrenesulfonic Acid Citation-Exchange Resin," The Journal of Physical Chemistry; Nov. 1954, vol. 58, pp. 984-986.

Harry P. Gregor et al., "Studies on Ion Exchange Resins. XV. Selectivity Coefficients of Methacrylic Acid Resins Toward Alkali Metal Cations," The Journal of Physical Chemistry, Mar. 1956, vol. 60, pp. 263-267.

Hybrid Plastics, Inc., "MA0735 POSS: Flow & Dispersion Aid for NBR/HNBR Reinforcemment" Superior Technology for Superior Products, www.hybridplastics.com, p. 1.

J.A. Marinsky et al., "Prediction of Ion-Exchange Selectivity," The Journal of Physical Chemistry, vol. 77, No. 17, 1973, pp. 2128-2132.

Masahiro Toyoda, et al. "Heavy oil sorption using exfoliated graphite New application of exfoliated graphite to protect heavy oil pollution", Carbon 38 (2000) 199-210, Pergamon, May 25, 1999.

Masahiro Toyoda, et al., "Sorption and recovery of heavy oil by using exfoliated graphite" Elsevier, Desalination 115 (1998) 199-201, Mar. 10, 1998.

Sinha et al., "Characterization of Substituted Phenol-Formaldehyde Resins Using Solid-State Carbon-13 NMR", University of Missouri-Rolla, May 22, 1989, pp. 1-22.

Toshiaki Enoki, et al., "Graphite Intercalation Compounds and Applications" Oxford Universite Press, 2003, Exfoliated Graphite Formed by Intercalation, www.oup.com, pp. 401-413.

U.Lohbauer, Dental glassionomer cements as permanent filing materials?—Properties, limitaions and future trends, Materials, 2010, 3, 76-96, see p. 78-79.

V. Smuleac, et al., "Polythiol-functionalized alumina membranes for mercury capture" Journal of Membrane Science 251 (2005) 169-178,, Elsevier, www.sciencedirect.com, Nov. 15, 2004.

Wei Gao, et al., "Engineered Graphite Oxide Materials for Application in Water Purification" Applied Materials & Interfaces, ACS Publications 2011 American Chemical Society, www.acsami.org, research article, pp. 1821-1826.

\* cited by examiner

SWELLABLE SEALING SYSTEMS AND METHODS FOR INCREASING SWELLING EFFICIENCY

BACKGROUND

Isolation of downhole environments depends on the deployment of a downhole tool that effectively seals the entirety of the borehole or a portion thereof, for example, an annulus between a casing wall and production tube. Swellable packers are particularly useful in that they are capable of generating a contact force against a nearby structure when exposed to one or more downhole fluids. Compared with mechanically setup packers and inflatable packers, fluid-swellable packers are easier to set up. However, as the oil and gas industry is shifting towards high temperature and high pressure applications, downhole fluids frequently contain heavy brines based on halides of multivalent cations. Heavy brines tend to decrease the amount of swelling as well as the packers' swelling rate. Accordingly, new swellable sealing systems and methods that improve upon swelling efficiency under a variety of conditions would be readily received in the art.

BRIEF DESCRIPTION

A sealing system comprises an article including a swellable composition comprising an elastomer and a super absorbent material; and an ion reducing material disposed with the swellable composition, the ion reducing material comprising one or more of the following: a chelating agent; a cation precipitating agent; or an anion precipitating agent.

A method of sealing comprises: disposing a sealing system in a borehole, the sealing system comprising a swellable article including a swellable composition comprising an elastomer and a super absorbent material; and an ion reducing material disposed with the swellable composition, the ion reducing material comprising one or more of the following: a chelating agent; a cation precipitating agent; or an anion precipitating agent; removing ions from a flow of fluid diffused into the sealing system with the ion reducing material; and swelling the article responsive to the flow of fluid thus sealing the borehole with the sealing system.

BRIEF DESCRIPTION OF THE DRAWINGS

The following descriptions should not be considered limiting in any way. With reference to the accompanying drawings, like elements are numbered alike:

FIG. 3 is a cross-sectional view of the sealing system of FIG. 2 where the swellable article has been deployed to expand and contact the wall of a borehole into which it has been inserted or run in.

DETAILED DESCRIPTION

Figure 1:
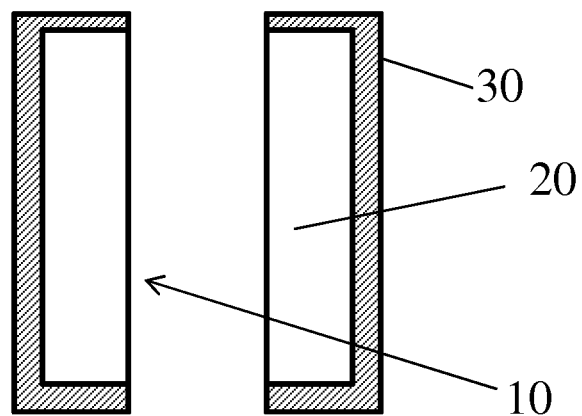
FIG. 1 shows a cross-sectional view of a swellable article having an outer covering of an ion reducing material, a central portion of a swellable composition, and an inner diameter available to accept a tube.

A detailed description of one or more embodiments of the disclosed apparatus and method are presented herein by way of exemplification and not limitation with reference to the Figures.

It has been found that the swelling performance of packers can be affected by the presence of certain cations or anions in the downhole fluids contacting the packers as well as the ionic strength of the downhole fluids. For example, the swelling ability of packers in brines based on salts having multivalent cations is several times lower than the swelling ability of the same packer in KCl or NaCl brines. In addition, the swelling ability decreases with the increasing salt concentration. Without wishing to be bound by theory, it is believed that pH, ionic strength or the presence of certain cations in the downhole fluids affects the swelling capacity of the super absorbent polymers in the packers. To mitigate the deleterious effect of polyvalent ions on the absorbent materials, an ion reducing material such as a chelating agent, a cation precipitating agent, or an anion precipitating agent, or a combination thereof can be used to remove the desirable ions. As a further advantageous feature, in some embodiments, the ion reducing material such as sodium citrate provides great reinforcement to the swellable composition in the pre-swollen state.

As used herein, an "ion reducing material" refers to a chemical that is effective in binding certain cations or anions either through chemical reactions or through physical associations so that these ions are prevented from adversely affecting the swelling efficiency of the swellable articles.

In an embodiment, the ion reducing material is a chelating agent which can optionally form several bonds to a single multivalent cation. Suitable chelating agents include those that are stable under high pressure and high temperature downhole conditions. Exemplary chelating agents include one or more of the following: ethylenediamine; porphine; porphyrin; diethylene triamine pentaacetic acid; ethylenediamine-N,N-disuccinic acid; nitrilotriacetic acid; ethylene glycol tetraacetic acid; hydroxyethylethylenediaminetriacetic acid; ammonium acetate; poly(gamma-glutamic acid); or sodium citrate. Sodium citrate is specifically mentioned. As used herein, sodium citrate includes monosodium citrate, disodium citrate, and trisodium citrate. Isomers or derivatives of these chelating agents can also be used. The chelating agents are effective to bind a cation of a metal selected from Group 1 to Group 14 of the periodic table, optionally a metal selected from Group 2 to Group 14 of the periodic table. Specifically the chelating agents are effective to bind a cation of one or more of the following metals: calcium; magnesium; chromium; iron; cobalt; tungsten; nickel; copper; zinc; or aluminum. The ions can be in any of their ionic states, for example, iron as $Fe^{2+}$, $Fe^{3+}$, or a combination thereof.

In another embodiment, the ion reducing material is a cation precipitating agent. Suitable cation precipitating agents include water soluble inorganic salts comprising an anion that forms a water insoluble salt with a single valent or multivalent cation. The cation precipitating agents include a single valent cation such as lithium, sodium, or potassium and an anion such as $CO_3^{2-}$; $C_2O_4^{2-}$; $PO_4^{3-}$; $SO_3^{2-}$; F; or $OH^-$. The cation precipitating agents can form a water insoluble salts with multivalent cations such as $Ca^{2+}$, $Mg^{2+}$, $Fe^{2+}$, $Fe^{3+}$, $Zn^{2+}$, or $Al^{3+}$ thus removing these cations from the fluids that contact the swellable article.

The cation precipitating agents can also be an organic carboxylic acid or a soluble salt thereof. The acid or its salts form insoluble salts with multivalent cations of calcium, magnesium, iron, zinc, copper, aluminum or the like. Exemplary organic carboxylic acids include fatty acids such as stearic acid, lauric acid, oleic acid, and the like. Illustratively, stearic acid can be used to precipitate calcium or zinc ions because calcium stearate and zinc stearate are insoluble in water.

In yet another embodiment, the ion reducing material is an anion precipitating agent. Preferably, the anion precipitating agent is effective to reduce a concentration of one or more of the following anions in a fluid: a halide; nitrate; sulfate; formate; carbonate; acetate; or propionate. Suitable anion precipitating agent includes water soluble salts containing $Ag^+$ or $Cu^+$, $Pb^{2+}$, or $Hg_2^{2+}$. For example, $Ag^+$ and $Cu^+$ can form insoluble salts with anions such as $Cl^-$ and $Br^-$ thus effectively removing these anions from the fluids that contact the swellable article. In a further advantageous feature, $Ag^+$ can also inhibit the growth of bacteria in swellable articles. Exemplary anion precipitating agents include silver nitrate and silver fluoride.

It is appreciated that in some embodiments an ion reducing material can precipitate both a multivalent cation and an anion in a downhole fluid at the same time. For example, AgF is effective to simultaneously remove cations such as $Ca^{2+}$ and anions such as $Cl^-$, $Br^-$ by precipitation.

The swellable composition includes an elastomer and a super absorbent material. The composition provides excellent swelling volumes. The elastomer can be an acrylonitrile butadiene rubber (NBR) and/or any polymer that is tolerated by or compatible with a liquid dispersed polymer (LDP) described herein. NBR is a family of unsaturated copolymers of 2-propenenitrile and various butadiene monomers (1,2-butadiene and 1,3-butadiene). Although its physical and chemical properties vary depending on the content of acrylonitrile (the more acrylonitrile within the elastomer base polymer, the higher resistance to oils but the lower the flexibility of the material), this form of synthetic rubber is generally resistant to oil, fuel, and other chemicals. Other types of NBR can also be used as the elastomer base polymer, for example, hydrogenated NBR (HNBR), carboxylated hydrogenated NBR (XHNBR), and NBR with some of the nitrile groups substituted by an amide group (referred to as amidated NBR or ANBR). Herein, NBR will pertain to any the aforementioned types. Suitable, but nonlimiting examples of NBR include, but are not limited to NIPOL™ 1014 NBR available from Zeon Chemicals, LP; Perbunan NT-1846 from LanXess or N22L from JSR. Given a suitable LDP, other elastomer base polymers can include, but are not necessarily limited to, ethylene-propylene-diene monomer copolymer rubber (EPDM), synthetic rubbers based on polychloroprene (NEOPRENE™ polymers from DuPont), fluorinated polymer rubbers (e.g. FKM), perfluorocarbon rubber (FFKM), tetrafluoro ethylene propylene rubbers (FEPM, such as AFLAS™ fluoroelastomers available from Asahi Glass Co. Ltd.), fluorosilicone rubber (FVMR), butyl rubbers (IIR), and the like. The NBR (or other elastomer base polymer) can be crosslinked. The crosslinks can be a product of crosslinking the polymer by sulfur, peroxide, urethane, metallic oxides, acetoxysilane, and the like. In particular, a sulfur or peroxide crosslinker is used.

Although NBR does not swell significantly in water, addition of a super absorbent material such as an acrylic copolymer (AC), a cellulosic material, or a combination thereof provide extremely high swelling capacity. The acrylic copolymer includes an acidic monomer and an amide monomer in a weight ratio of 99:1 to 1:99, specifically 95:5 to 5:95, and more specifically 90:10 to 10:90. Exemplary acidic monomers include acrylic acid, methacrylic acid, itaconic acid, maleic acid, fumaric acid, or a combination comprising at least one of these. In an embodiment, the acidic monomer is acrylic acid or methacrylic acid. Exemplary amide monomers include acrylamide; N-alkyl acrylamides such as N-methylacrylamide, N,N-dimethylacrylamide, N-ethylacrylamide, N,N-diethylacrylamide, or N-hydroxyethylacrylamide; methacrylamide; N-alkyl methacrylalmides such as N-methylmethacrylamide, N,N-dimethylmethacrylamide, N-ethylmethacrylamide, N,N-diethylmethacrylamide, N-hydroxyethylmethacrylamide, or N,N-dihydroxyethylmethacrylamide; maleimide; N-alkylmaleimides such as N-methylmaleimide, N-ethylmaleimide, N-phenylmaleimide, and the like; or a combination comprising at least one of the foregoing. In an embodiment, the amide monomer is acrylamide or methacrylamide.

Advantageously, the acrylic copolymer is dispersed in a medium, such as in a refined oil or oil/water emulsion. Such a dispersion is also referred to herein as a liquid dispersed polymer (LDP). The refined oil is as described herein a petroleum distillate fraction and may be any $C_{15-40}$ petroleum fraction useful for swelling the base polymer, where the refined oil has a high affinity for the base polymer and for which the base polymer has a high capacity. As used herein, the term "high capacity" with respect to the base polymer is where the base polymer can absorb up to 200 phr, specifically 100 to 150 phr, of refined oil based on 100 parts of base polymer and any added fillers. The refined oil may be a naphthenic oil comprising mostly cycloalkanes and having an n-alkane (paraffin) content of less than about 55-60%; a paraffinic oil (sometimes referred to as a heavy naphtha) having an n-alkane content of greater than about 55-60%; an aromatic oil, such as a phthalate oil derived from phthalic anhydride, and including such compounds as, for example di-n-butylphthalate; or a combination comprising at least one of the foregoing. Of these, it is more desirable to use refined oils that are non-aromatic.

In an embodiment, the refined mineral oil is a phthalate oil, a naphthenic oil, a paraffinic oil, or a combination comprising at least one of the foregoing oils. In a specific embodiment, the acrylic copolymer is dispersed in a nitrile-compatible phthalate ester, for example, the acrylic copolymer can be a mixture comprised of approximately 50% active polymer and 50% phthalate ester oil carrier. Examples of this material include, but are not necessarily limited to, those produced by CIBA Specialty Chemicals (UK) for use in PVC, as well as any other material generally regarded as a super absorbent polymer (SAP) in solid or liquid form. Another suitable LDP available from CIBA Specialty Chemicals is one that is based in either a paraffinic, naphthenic, or aromatic based oil or any combination thereof, which is compatible with EPDM. Another alternative material includes AQUALIC CS-6S, a water absorbent polymer available from Nippon Shokubai Co., Ltd. in solid powder form.

The amount of acrylic copolymer in LDP is 20 to 80 wt %, specifically 30 to 70 wt %, and more specifically 40 to 60 wt %, based on the total weight of the LDP.

Cellulose is a general name and in general a commodity. One non-limiting, example is chemically referred to as carboxymethyl cellulose (CMC) and is generally sold under some form of this name. Other examples of CMC include AKUCELL™ AF3281 CMC available from Akzo Nobel, CMC from Aqualon, and CMC from Quingdae Rich Chemicals. Other general cellulosic materials such as hydroxypropylmethyl cellulose (HPMC) or methylcellulose (MC) and combinations thereof can also be used.

The amount of these three ingredients (elastomers such as NBR, LDP, and CMC) is about 15 weight percent (wt. %) to about 35 wt. % for each, based on the weight of the swellable composition. Normally, the amount of components in a rubber composition is expressed in terms of parts per hundred parts rubber (phr). Such compositions start with 100 parts of raw polymer and then other materials are expressed in parts compared to that. In one non-limiting embodiment, the elastomer base polymer is 100 phr NBR with about 18 vol. % to about 52 vol. % ACN (acrylonitrile). In the swellable composition, the amount of LDP is from about 80 phr to about 140 phr. The amount of the CMC is from about 50 phr to about 150 phr.

Additives such as fillers, activators, antioxidants, processing acids, and curatives can be included in the swellable composition.

Fillers include reinforcing and non-reinforcing fillers. Reinforcing fillers include, for example, silica, glass fiber, carbon fiber, or carbon black, which can be added to the composition to increase strength. Non-reinforcing fillers such as polytetrafluoroethylene (PTFE), molybdenum disulfide ($MoS_2$), or graphite can be added to the composition to increase the lubrication. Nanofillers are also useful, and are reinforcing or non-reinforcing. Nanofillers, such as carbon nanotubes, nanographenes, nanoclays, polyhedral oligomeric silsesquioxane (POSS), or the like, can be incorporated into the composition to increase the strength and elongation of the material. Nanofillers can further be functionalized to include grafts or functional groups to adjust properties such as solubility, surface charge, hydrophilicity, lipophilicity, and other properties. Silica and other oxide minerals can also be added to the composition. Combinations comprising at least one of the foregoing fillers can be used. The proportion of filler may range between about 30 and 100 phr.

Suitable activators include, but are not necessarily limited to, magnesium oxide (MgO), zinc oxide (ZnO), zinc stearate, stearic acid and the like and combinations thereof. The proportion of activator may be in the range from about 1-10 phr.

Suitable antioxidants include, but are not necessarily limited to, any of the diphenyl amines (e.g. NAUGARD® antioxidants available from Chemtura Corporation), or any of the mercaptobenzimidazoles (e.g., VANOX® ZMTI from RT Vanderbilt) and the like and combinations thereof.

A processing aid is a compound included to improve flow, moldability, and other properties of the swellable composition. Processing aids include, for example an oligomer, a wax, a resin, a fluorocarbon, or the like. Exemplary processing aids include stearic acid and derivatives, low molecular weight polyethylene, and the like. Combinations comprising at least one of the foregoing fillers can be used. The antioxidants and the process aids may each be in the range of from about 0.5 to about 5.0 phr.

In an exemplary embodiment, a swelling composition includes 100 phr elastomer, about 30 to about 200 phr, about 50 to about 150 phr, or about 100 to about 150 phr acrylic copolymer, about 50 to about 150 phr or about 100 to about 150 phr of CMC, about 0.2 to 15 phr or about 0.2 to 3 phr curative such as sulfur, about 30 to about 100 phr or about 60 to about 100 phr carbon black filler, about 20 to about 100 phr or about 20 to about 50 phr silica filler, about 1 to about 10 phr or about 3 to about 8 phr activator, about 0.5 to about 5 phr or about 0.5 to 3 phr antioxidant, and about 0.5 to about 5 phr or about 0.2 to about 3 phr process aid.

In an embodiment, the ion reducing material is dispersed uniformed in the swellable composition. In another embodiments, the ion reducing material is disposed on a surface of the article formed from the swellable composition as a coating or a shell. For example, the ion reducing material may be disposed on the surface of the article as well as being interposed with the swellable composition included in the article. In another embodiment, the ion reducing material is disposed on the article as a surface coating without being interposed with the swellable composition. The coating or shell can cover the entirety of the article or a portion of the article. In addition to the ion reducing material, the coating can further include a flexible fibrous material such as polyester fibers, nylon fibers, glass fibers, and the like. Advantageous, the coating or shell encapsulating the swellable article is extendable but not swellable. In yet another embodiment, the ion reducing material forms a fluid permeable member disposed in a fluid passageway for communicating fluid to the swellable article. In this way, the undesirable ions in the downhole fluid can be removed by the ion reducing materials first before the fluid reaches the swellable composition.

FIG. 1 shows a sealing system containing an article 20 including a swellable composition and an ion reducing material 30 partially covering article 20. In this embodiment, the article 20 has an inner diameter 10 that can accept, for example a tube.

Figure 2:
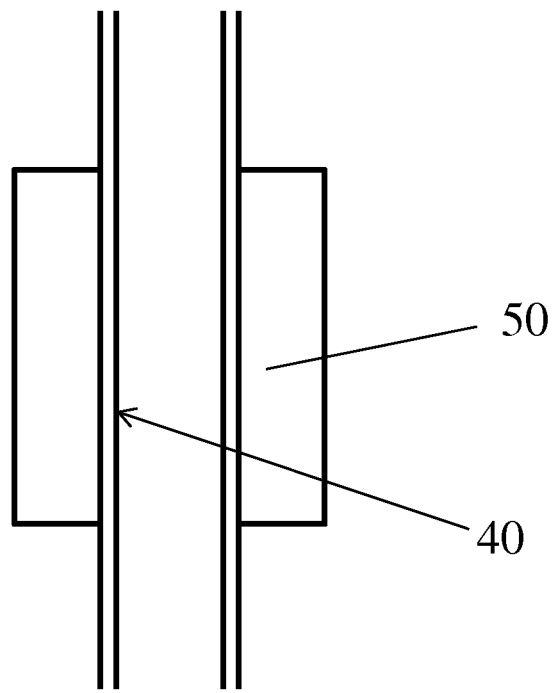
FIG. 2 is a cross-sectional view of a sealing system having a central support substrate or pipe that bears a swellable article according to an embodiment of the disclosure in an original, non-expanded shape.
Figure 3:
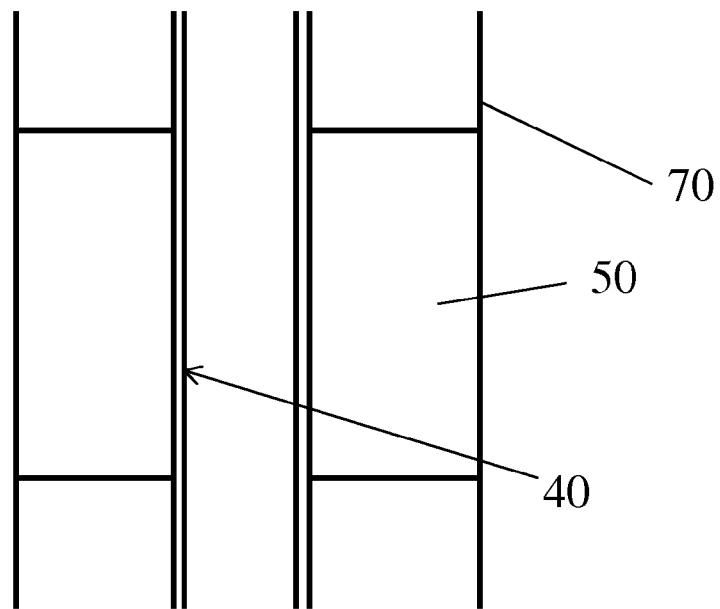

FIG. 2 shows a swellable article 50 including a swellable composition and an ion reducing material dispersed uniformly throughout the swellable composition. The article is disposed on tubing 40. The cross-sectional area of the swellable article 50 is less than the borehole diameter, which allows the swellable article 50 to be placed easily into the correct location downhole. In this initial state, the swellable composition has not expanded to an appreciable amount. As shown in FIG. 3, upon contact with a downhole fluid, article 50 swells and seals an annular area between tubing 40 and borehole walls 70.

The amount of the ion reducing present in the sealing system is that amount effective to remove polyvalent ions from a fluid in order to improve the swelling efficiency of the swellable composition. In an embodiment, the ion reducing material is present in an amount such that the swellable composition maintains from about 50% to about 100%, more specifically from about 70% to about 100%, and more specifically about 85% to about 100%, of the overall volumetric expansion of the swellable composition in water that is substantially free of polyvalent ions. According to an embodiment, the amount of the ion reducing material is from about 0.01 to about 50 wt. %, or about 0.1 to about 50 wt. % or about 0.1 to about 40 wt. %, based on the total weight of the swellable composition.

The combination of the ion reducing material and the swellable composition has many uses and is highly efficient at expansion due to the absorption of fluid having decreased amounts of undesirable ions due to the ion reducing material. The combinations are useful as selectively deployed sealing systems for flow channels, particularly well flow channels such as annuli and the like. Suitable sealing systems for use in hydrocarbon exploration and recovery operations include, but are not necessarily limited to, packers, bridge plugs, expandable pipes, or any other borehole article requiring a swelling or expanding area to seal or block fluid flow.

The sealing system can further have an elastomer coating covering the swellable article and the ion reducing material. Such an elastomer is impermeable to downhole fluid to protect the swellable composition and ion reducing material from premature contact with downhole fluid. The elastomer can be any elastomeric material that is impermeable to downhole fluid, including those elastomers described above that are impermeable to downhole fluid, e.g., VITON elastomer. An orifice or valve can be attached to the ion reducing material or the swellable article to control fluid communication between the downhole environment and the ion reducing material and swellable composition. The valve traverses or penetrates the elastomer so that downhole fluid can flow through the valve to contact the ion reducing material and the swellable composition.

Figure 4:
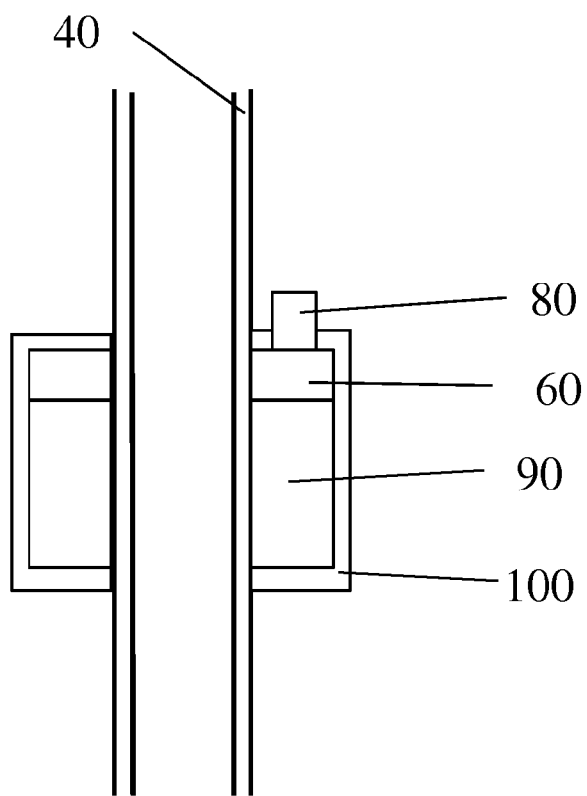
FIG. 4 is a cross-sectional view of a sealing system according to another embodiment of the disclosure.

In an embodiment illustrated in FIG. 4, a sealing system includes swellable article 90, which contains a swellable composition, a permeable member 60 containing an ion reducing material, an elastomer coating 100 disposed on a surface of the swellable article 90 and the permeable member 60, and a valve 80 attached to permeable member 60. The valve 90 can be, for example, a needle valve plugged with a degradable material, a water-soluble polymer, or a controlled electrolytic material (CEM) such as magnesium or its alloys, or a combination thereof. The CEM is controllably dissolved by contact with certain downhole fluids. After the plugged material is removed from the valve 90, fluid flows through the valve 90, and the ion reducing material in the permeable member 60 removes undesirable ions in the downhole fluid before it reaches the swellable article 90.

A method of sealing comprises: disposing a sealing system in a borehole, the sealing system comprising a swellable article including a swellable composition comprising an elastomer and a super absorbent material; and an ion reducing material disposed with the swellable composition, the ion reducing material comprising one or more of the following: a chelating agent; a cation precipitating agent; or an anion precipitating agent; removing ions from a flow of fluid diffused into the sealing system with the ion reducing material; and swelling the article responsive to the flow of fluid thus sealing the borehole with the sealing system. Removing ions from a flow of fluid comprises binding a multivalent cation in the fluid with the ion reducing material. In an embodiment, the undesirable ions are removed by an ion reducing material before the fluid reaches the swellable composition.

EXAMPLES

Formulation 1 was a swellable composition containing 100 phr nitrile (NBR) with CAN, 150 phr CMC, 80 phr carbon black, 40 phr silica, 120 phr an acrylic copolymer, 5 phr magnesium oxide, 2 phr of antioxidant, 1 phr wax, 0.8 phr sulfur, and 0.5 phr accelerator. Formulation 2 was a combination of 80 wt. % of sample 1 and 20 wt. % of sodium citrate. Sodium citrate was uniformly dispersed in the formulation. Both formulations 1 and 2 were molded and cured at 300° F. for 75 minutes to mold rubber buttons.

Swelling experiment was conducted at 200 F in 10% $CaCl_2$ brine. Volume of rubber buttons was measured on a daily basis. The sample of formulation 2 achieved more than double volume increase after 4 days, demonstrating an improved swelling efficiency of the formulation containing an ion reducing material such as sodium citrate.

Without wishing to be bound by theory, it is believed that this was achieved due to ability of sodium citrate to bind calcium cations by chelating and/or ion exchange mechanism. The results are provided in Table 1. The method can be expanded to other chelating agents or precipitating agents that can bind calcium or other multivalent cations present in brines.

TABLE 1

| Sample | Time (h) | | | | Specific Gravity |
| --- | --- | --- | --- | --- | --- |
| | 0 | 24 | 48 | 72 | 98 | |
| Formulation 1 | 0 | na | na | Na | 27 | 1.25 |
| Formulation 2 | 0 | 35 | 46 | 54 | 60 | 1.28 |

Compression test was conducted on MTS Insight in compression mode on Standard Size Rubber buttons (~1 inch in diameter, ~0.5 inch in thickness). Clamps were moving at a set speed of 0.5 inch/min to compress sample to 70% strain. The results are shown in Table 2. The compression test results on rubber buttons demonstrated that a swellable composition containing sodium citrate had much higher compression modulus as compared to a swellable composition that did not contain sodium citrate. The results indicate that sodium citrate can provide great reinforcement to a swellable composition in the pre-swollen state.

TABLE 2

| Sample | Compression Modulus (PSI) | | | | |
| --- | --- | --- | --- | --- | --- |
| | $C_{10}$ | $C_{20}$ | $C_{30}$ | $C_{50}$ | $C_{70}$ |
| Formulation 1 | 72 | 153 | 234 | 651 | 2929 |
| Formulation 2 | 317 | 538 | 815 | 2708 | 5725 |

All ranges disclosed herein are inclusive of the endpoints, and the endpoints are independently combinable with each other. "Or" means "and/or." As used herein, "combination" is inclusive of blends, mixtures, alloys, reaction products, and the like. "A combination thereof" means "a combination comprising one or more of the listed items and optionally a like item not listed." All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed:
1. A sealing system comprising
an article including a swellable composition comprising
100 parts by weight of an elastomer comprising one or more of the following: acrylonitrile butadiene rubber, hydrogenated acrylonitrile butadiene rubber, carboxylated hydrogenated acrylonitrile butadiene rubber, amidated acrylonitrile butadiene rubber; ethylene propylene diene monomer rubber; polychloroprene rubber; fluorinated polymer rubber, perfluoro- carbon rubber; tetrafluoro ethylene propylene rubber; fluorosilicone rubber; or butyl rubber,
about 50 to about 150 parts by weight of an acrylic copolymer; and
about 50 to about 150 parts by weight of a cellulose material; and
an ion reducing material disposed with the swellable composition, the ion reducing material comprising one or more of the following: a chelating agent; a cation precipitating agent; or an anion precipitating agent, the ion reducing material being present in an amount of about 0.1 wt. % to about 40 wt. % based on the total weight of the swellable composition;
wherein the chelating agent is effective to bind a cation of one of the following metals in a fluid that contacts the sealing system: calcium; magnesium; chromium; iron; cobalt; tungsten; nickel; copper; zinc; or aluminum; and the chelating agent is one or more of the following: ethylenediamine; porphine; porphyrin; diethylene triamine pentaacetic acid; ethylenediamine-N,N-disuccinic acid; nitrilotriacetic acid; ethylene glycol tetraacetic acid; hydroxyethylethylenediaminetriacetic acid; ammonium acetate; poly(gamma-glutamic acid); or sodium citrate;
the cation precipitating agent is a water soluble inorganic salt comprising a single valent cation and an anion that is one or more of the following: $C_2O_4^{2-}$; $PO_4^{3-}$; $SO_3^{2-}$; or $F^-$; or the cation precipitating agent is an organic carboxylic acid or a soluble salt thereof; and
the anion precipitating agent is effective to reduce a concentration of one or more of the following anions in a fluid: a halide; nitride; sulfate; formate; carbonate; acetate; or propionate.

2. The sealing system of claim 1, wherein the ion reducing material is the water soluble inorganic salt.

3. The sealing system of claim 2, wherein a cation of the water soluble inorganic salt is lithium, sodium, or potassium.

4. The sealing system of claim 1, wherein the ion reducing material is an organic carboxylic acid or a soluble salt thereof.

5. The sealing system of claim 1, wherein the ion reducing material is effective to reduce a concentration of one or more of the following anions in a fluid: a halide; nitrate; sulfate; formate; carbonate; acetate; or propionate.

6. The sealing system of claim 1, wherein the ion reducing material is a water soluble salt comprising $Ag^+$, $Cu^+$, $Pb^{2+}$, or $Hg_2^{2+}$.

7. The sealing system of claim 1, wherein the ion reducing material is uniformly dispersed in the swellable composition.

8. The sealing system of claim 1, wherein the ion reducing material forms a fluid permeable member operatively arranged so that a fluid flows through the permeable member before reaching the swellable member.

9. The sealing system of claim 1, wherein the ion reducing material is sodium citrate.

10. A method of sealing, the method comprising:
disposing a sealing system of claim 1 in a borehole;
removing ions from a flow of fluid diffused into the sealing system with the ion reducing material; and
swelling the article responsive to the flow of fluid thus sealing a borehole with the sealing system.

11. The method of claim 10, wherein the swellable article is encapsulated with an extendable but not swellable shell filled with the ion reducing material, which binds a single or multivalent cation from the fluid diffusing into the swellable article.

12. The method of claim 10, wherein removing ions from a flow of fluid comprises binding an anion with a water soluble salt comprising $Ag^+$, $Cu^+$, $Pb^{2+}$, or $Hg_2^{2+}$.

13. The sealing system of claim 10, wherein the ion reducing material is sodium citrate.

14. The method of claim 10, wherein removing ions from a flow of fluid comprises binding a multivalent cation in the fluid with a chelating agent, a cation precipitating agent, or a combination thereof.

15. The method of claim 14, wherein the ion reducing material is an organic carboxylic acid or a soluble salt thereof.

16. A sealing system comprising
an article including a swellable composition comprising an elastomer and a super absorbent material;
the elastomer comprising one or more of the following: acrylonitrile butadiene rubber, hydrogenated acrylonitrile butadiene rubber, carboxylated hydrogenated acrylonitrile butadiene rubber; amidated acrylonitrile butadiene rubber; ethylene propylene diene monomer rubber; polychloroprene rubber; fluorinated polymer rubber; perfluorocarbon rubber, tetrafluoro ethylene propylene rubber; fluorosilicone rubber; or butyl rubber, and
the superabsorbent material comprises a cellulose material and an acrylic copolymer; and
an ion reducing material disposed with the swellable composition, the ion reducing material comprising one or more of the following: a chelating agent; a cation precipitating agent; or an anion precipitating agent; the ion reducing material being present in an amount of about 0.1 wt. % to about 40 wt. % based on the total weight of the swellable composition;
wherein a coating comprising the ion reducing material is disposed on a surface of the article.

17. The sealing system of claim 16, wherein the ion reducing material is uniformly dispersed in the swellable composition.

18. The sealing system of claim 16, wherein the swelling composition comprises 100 parts by weight of the elastomer, about 50 to about 150 parts by weight of the acrylic copolymer, and about 50 to about 150 parts by weight of the cellulose material.

* * * * *